US011289081B2

(12) United States Patent
Asada et al.

(10) Patent No.: US 11,289,081 B2
(45) Date of Patent: Mar. 29, 2022

(54) REFRIGERATOR

(71) Applicant: SHARP KABUSHIKI KAISHA, Sakai (JP)

(72) Inventors: Takashi Asada, Sakai (JP); Seishiro Otoge, Sakai (JP); Kinya Yamade, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 254 days.

(21) Appl. No.: 16/669,004

(22) Filed: Oct. 30, 2019

(65) Prior Publication Data

US 2020/0152192 A1 May 14, 2020

(30) Foreign Application Priority Data

Nov. 8, 2018 (JP) ............... JP2018-210624

(51) Int. Cl.
*G10L 15/22* (2006.01)
*G10L 15/30* (2013.01)
*H04R 1/04* (2006.01)
*G08B 21/18* (2006.01)
*G08B 3/10* (2006.01)
(Continued)

(52) U.S. Cl.
CPC .............. *G10L 15/22* (2013.01); *F25D 29/00* (2013.01); *G08B 3/10* (2013.01); *G08B 21/182* (2013.01); *G10L 15/30* (2013.01); *H04R 1/04* (2013.01); *H04R 1/08* (2013.01); *G10L 2015/223* (2013.01)

(58) Field of Classification Search
CPC ...... F25D 23/028; F25D 29/00; F25D 17/062; F25D 17/045; G06F 3/165; G06F 16/00; G06F 30/13; G06F 3/167; G06K 9/00288; G06K 9/2081; G06Q 20/40145; G06Q 30/0641; G07C 9/00896; G08B 3/10; G08B 21/0484; G08B 21/182; G10L 15/08; G10L 15/22; G10L 15/30; G10L 17/24; G10L 2015/223; G10L 15/25; G10L 25/66; H04R 1/04; H04R 1/08; H03K 17/965
USPC ........... 62/449; 340/10.1, 12.54; 704/9, 251, 704/275, 276, 231, 246, 257, 260, 270, 704/270.1, 273; 367/198; 381/58; 455/563; 705/14.53; 715/728
See application file for complete search history.

(56) References Cited

U.S. PATENT DOCUMENTS 4,401,852 A * 8/1983 Noso ................... B60R 16/0373
367/198
5,857,172 A * 1/1999 Rozak ...................... G06F 3/16
704/275
(Continued)

FOREIGN PATENT DOCUMENTS

JP 3904390 B2 4/2007
JP 2017-004231 A 1/2017

*Primary Examiner* — Gerald Gauthier
(74) *Attorney, Agent, or Firm* — ScienBiziP, P.C.

(57) ABSTRACT

In a refrigerator, when a door switch detects opening of a door of the refrigerator, a voice recognition control unit determines whether voice data acquired by a voice acquisition unit satisfies a predetermined voice recognition start condition. In a case where the voice recognition start condition is satisfied, the recognition control unit controls the voice recognition unit to perform voice recognition. However, in a case where the voice recognition start condition is not satisfied, the recognition control unit controls the voice recognition unit not to perform voice recognition.

7 Claims, 14 Drawing Sheets

(51) Int. Cl.
*F25D 29/00* (2006.01)
*H04R 1/08* (2006.01)

(56) References Cited

U.S. PATENT DOCUMENTS

| | | | | |
|---|---|---|---|---|
| 5,983,186 A * | 11/1999 | Miyazawa | G10L 15/26 | 704/233 |
| 6,243,683 B1 * | 6/2001 | Peters | G10L 15/24 | 434/4 |
| 6,505,159 B1 * | 1/2003 | Theodore | H04M 1/72502 | 704/270 |
| 6,538,666 B1 * | 3/2003 | Ozawa | G10L 15/22 | 715/728 |
| 6,594,632 B1 * | 7/2003 | White | G10L 15/22 | 704/246 |
| 6,629,077 B1 * | 9/2003 | Arling | G10L 15/26 | 704/270 |
| 6,778,098 B2 * | 8/2004 | Geurts | G08C 17/02 | 340/12.54 |
| 8,165,883 B2 * | 4/2012 | Galanes | G06F 9/451 | 704/270 |
| 8,224,650 B2 * | 7/2012 | Galanes | H04M 3/4938 | 704/270.1 |
| 8,311,835 B2 * | 11/2012 | Lecoeuche | G10L 15/26 | 704/270.1 |
| 8,326,636 B2 * | 12/2012 | White | H04M 1/7243 | 704/275 |
| 8,364,484 B2 * | 1/2013 | Yano | G10L 25/78 | 704/246 |
| 8,452,597 B2 * | 5/2013 | Bringert | G10L 15/28 | 704/251 |
| 8,958,848 B2 * | 2/2015 | Shin | H04M 1/271 | 455/563 |
| 9,443,527 B1 * | 9/2016 | Watanabe | G10L 15/26 | |
| 10,563,902 B2 * | 2/2020 | Kim | F25D 29/005 | |
| 10,614,805 B2 * | 4/2020 | Huang | G06F 3/02 | |
| 2002/0013709 A1 * | 1/2002 | Ortega | G10L 15/22 | 704/260 |
| 2002/0077830 A1 * | 6/2002 | Suomela | G06F 3/167 | 704/275 |
| 2002/0107696 A1 * | 8/2002 | Thomas | G10L 15/26 | 704/275 |
| 2003/0028382 A1 * | 2/2003 | Chambers | G10L 15/26 | 704/275 |
| 2005/0021343 A1 * | 1/2005 | Spencer | G09B 5/06 | 704/275 |
| 2006/0218035 A1 * | 9/2006 | Park | G06Q 30/0272 | 705/14.53 |
| 2006/0253287 A1 * | 11/2006 | Kammerer | | 704/275 |
| 2007/0005370 A1 * | 1/2007 | Elshout | G10L 15/26 | 704/275 |
| 2009/0326957 A1 * | 12/2009 | Yang | G10L 15/26 | 704/275 |
| 2010/0024466 A1 * | 2/2010 | Kwon | F25D 11/02 | 62/449 |
| 2011/0210822 A1 * | 9/2011 | Lee | F25D 29/00 | 340/10.1 |
| 2011/0301950 A1 * | 12/2011 | Ouchi | G10L 15/28 | 704/231 |
| 2012/0179473 A1 * | 7/2012 | Yano | G10L 15/22 | 704/275 |
| 2012/0265538 A1 * | 10/2012 | Gustafsson | H04N 5/23203 | 704/275 |
| 2013/0179173 A1 * | 7/2013 | Lee | G10L 15/22 | 704/275 |
| 2013/0297319 A1 * | 11/2013 | Kim | G10L 15/22 | 704/275 |
| 2013/0325479 A1 * | 12/2013 | Krueger | G10L 21/00 | 704/275 |
| 2014/0149118 A1 * | 5/2014 | Lee | G10L 15/22 | 704/251 |
| 2015/0032460 A1 * | 1/2015 | Kang | G06F 3/167 | 704/276 |
| 2016/0011853 A1 * | 1/2016 | Rogers | G06F 3/01 | 704/275 |
| 2016/0138858 A1 * | 5/2016 | Lu | F25D 29/00 | 704/275 |
| 2016/0150338 A1 * | 5/2016 | Kim | H04R 29/004 | 381/58 |
| 2016/0217795 A1 * | 7/2016 | Lee | G10L 17/24 | |
| 2016/0372138 A1 * | 12/2016 | Shinkai | G10L 15/22 | |
| 2017/0004828 A1 * | 1/2017 | Lee | G10L 13/033 | |
| 2017/0076724 A1 * | 3/2017 | Park | G10L 15/08 | |
| 2017/0236514 A1 * | 8/2017 | Nelson | G10L 15/22 | 704/257 |
| 2017/0293966 A1 * | 10/2017 | Huang | G06Q 30/00 | |
| 2017/0345422 A1 * | 11/2017 | Yang | G10L 15/22 | |
| 2018/0025733 A1 * | 1/2018 | Qian | G10L 15/22 | 704/275 |
| 2018/0120019 A1 * | 5/2018 | Kim | F25D 23/02 | |
| 2018/0144397 A1 * | 5/2018 | Wilkinson | G06Q 20/102 | |
| 2018/0158460 A1 * | 6/2018 | Lee | H05B 47/12 | |
| 2018/0173494 A1 * | 6/2018 | Choi | G06N 20/00 | |
| 2018/0174223 A1 * | 6/2018 | Cantrell | G10L 25/51 | |
| 2018/0189027 A1 * | 7/2018 | Jeon | F25D 29/00 | |
| 2018/0233014 A1 * | 8/2018 | Wilkinson | G08B 21/0484 | |
| 2018/0266751 A1 * | 9/2018 | Lim | F25D 23/028 | |
| 2018/0277112 A1 * | 9/2018 | Kim | G10L 15/08 | |
| 2018/0300677 A1 * | 10/2018 | Wilkinson | G06Q 10/0836 | |
| 2019/0066680 A1 * | 2/2019 | Woo | G10L 15/08 | |
| 2020/0003484 A1 * | 1/2020 | Yamade | F25D 17/062 | |
| 2020/0036906 A1 * | 1/2020 | Yamade | H04N 5/247 | |
| 2020/0152192 A1 * | 5/2020 | Asada | G08B 21/182 | |
| 2020/0183649 A1 * | 6/2020 | Jeon | G06F 3/0482 | |

* cited by examiner

REFRIGERATOR

BACKGROUND

1. Field

The present disclosure relates to a refrigerator having a voice acquisition function.

2. Description of the Related Art

In recent years, a refrigerator has been developed that is capable of acquiring a user's voice by a voice acquisition apparatus such as a microphone and capable of performing voice recognition on the acquired voice.

Japanese Patent No. 3904390 discloses a configuration in which an operation-related function unit is provided in an upper front part of a refrigerator body, and a voice-related function such as a microphone or a speaker is incorporated in the operation-related function unit.

Japanese Patent Unexamined Patent Application Publication No. 2017-4231 discloses a home appliance such as a refrigerator configured such that when an occurrence of a predetermined event, that can trigger the start of a voice acquisition unit, is detected, the voice acquisition unit is activated to acquire a voice, and a user is notified that the voice acquisition unit is in operation. Examples of such events are, for example, opening of a door of the refrigerator, operating on a predetermined button of the refrigerator, etc. The notification of the operating state of the voice acquisition unit is performed by outputting a voice or turning on a notification lamp. The notification lamp is provided on an operation panel installed on a front door of the refrigerator. In the refrigerator described in Japanese Patent Unexamined Patent Application Publication No. 2017-4231, the configuration described above makes it possible to reduce the user's anxiety about the voice acquisition function, such as whether a user's utterance has been correctly acquired, whether the voice acquisition function is inactive when voice acquisition is not desired, etc.

However, in the configuration disclosed in Japanese Patent Unexamined Patent Application Publication No. 2017-4231, voice recognition is continuously performed as long as the door of the refrigerator is in an open state. In this case, although the user is notified that voice recognition is in operation, a user is supposed to perform a manual operation to stop the voice recognition.

That is, when the user wants the operation of voice recognition not to be performed, the user is supposed to perform an operation to stop the voice recognition. If the user forgets to stop the voice recognition, the voice recognition is unnecessarily performed.

In view of the above, an aspect of the present disclosure provides a refrigerator capable of performing, at a proper timing, voice recognition on an utterance by a user.

SUMMARY

In an aspect of the present disclosure, a refrigerator includes a voice acquisition unit, a door opening and closing detection unit configured to detect opening and closing of a door of the refrigerator, and a voice recognition control unit configured such that when the door opening and closing detection unit detects opening of the door, the voice recognition control unit determines whether voice data acquired by the voice acquisition unit satisfies a predetermined voice recognition start condition, and in case where the voice data satisfies the voice recognition start condition, the voice recognition control unit controls the voice recognition unit to perform voice recognition on the voice data, while in a case where the voice data does not satisfy the voice recognition start condition, the voice recognition control unit controls the voice recognition unit not to perform voice recognition on the voice data.

DESCRIPTION OF THE EMBODIMENTS

First Embodiment

A first embodiment of the present disclosure is described in detail below.

Configuration of Voice Interaction System 1

Figure 1:
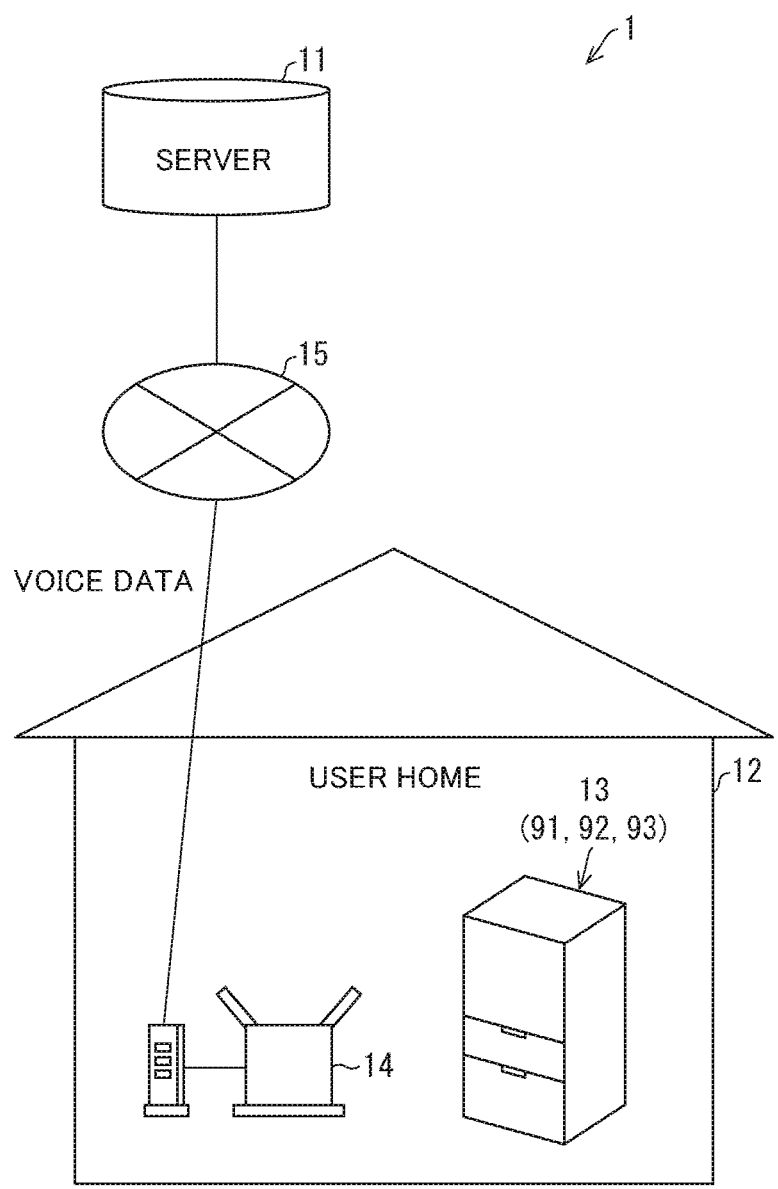
FIG. 1 is a schematic diagram illustrating a configuration of a voice interaction system including a refrigerator according to an embodiment of the present disclosure.

FIG. 1 is a schematic diagram illustrating a configuration of a voice interaction system 1 including a refrigerator 13 according to the first embodiment. As shown in FIG. 1, in the voice interaction system 1, a server 11 and the refrigerator 13 installed in a user home 12 are connected via a communication network 15.

The refrigerator 13 is a networked home appliance having a wireless communication function for communicating with the server 11 via the communication network 15. The wireless communication function may be built in the refrigerator 13 or may be provided in a communication adapter attached to the body portion of the refrigerator 13.

The user home 12 is provided with a wireless local area network (LAN) that forms part of the communication network 15. A wireless AP 14 of the wireless LAN is connected to the communication network 15 including the Internet. The wireless AP 14 is a communication device such as a WiFi (registered trademark) router or a WiFi (registered trademark) access point. In the present embodiment, it is assumed by way of example that the communication network 15 includes the Internet. However, a telephone line network, a mobile communication network, a CATV (CAble Television) communication network, a satellite communication network, or the like may also be used.

The refrigerator 13 has a voice interaction function for acquiring a voice uttered by a user and uttering an answer to the acquired voice. In this function, the refrigerator 13 transmits voice data of the acquired voice to the server 11, and the server 11 performs voice recognition on the voice data received from the refrigerator 13 and identifies a content of the utterance. The server 11 transmits voice data of an answer based on the identified content to the refrigerator 13. The voice data of the answer is voice data uttered from the refrigerator 13. For example, the voice data of the answer may be voice data that responds to a question from the user, voice data that establishes a dialogue with the content of the user's utterance, etc.

Note that the refrigerator 13 may have a voice recognition function and may perform voice recognition at the refrigerator 13 to identify the content of the utterance, transmit the identified content to the server 11, and receive the voice data of the answer from the server 11. In an alternatively configuration, voice recognition and responding may be performed by the refrigerator 13 without using the server 11.

Configuration of Refrigerator 13

Figure 2:
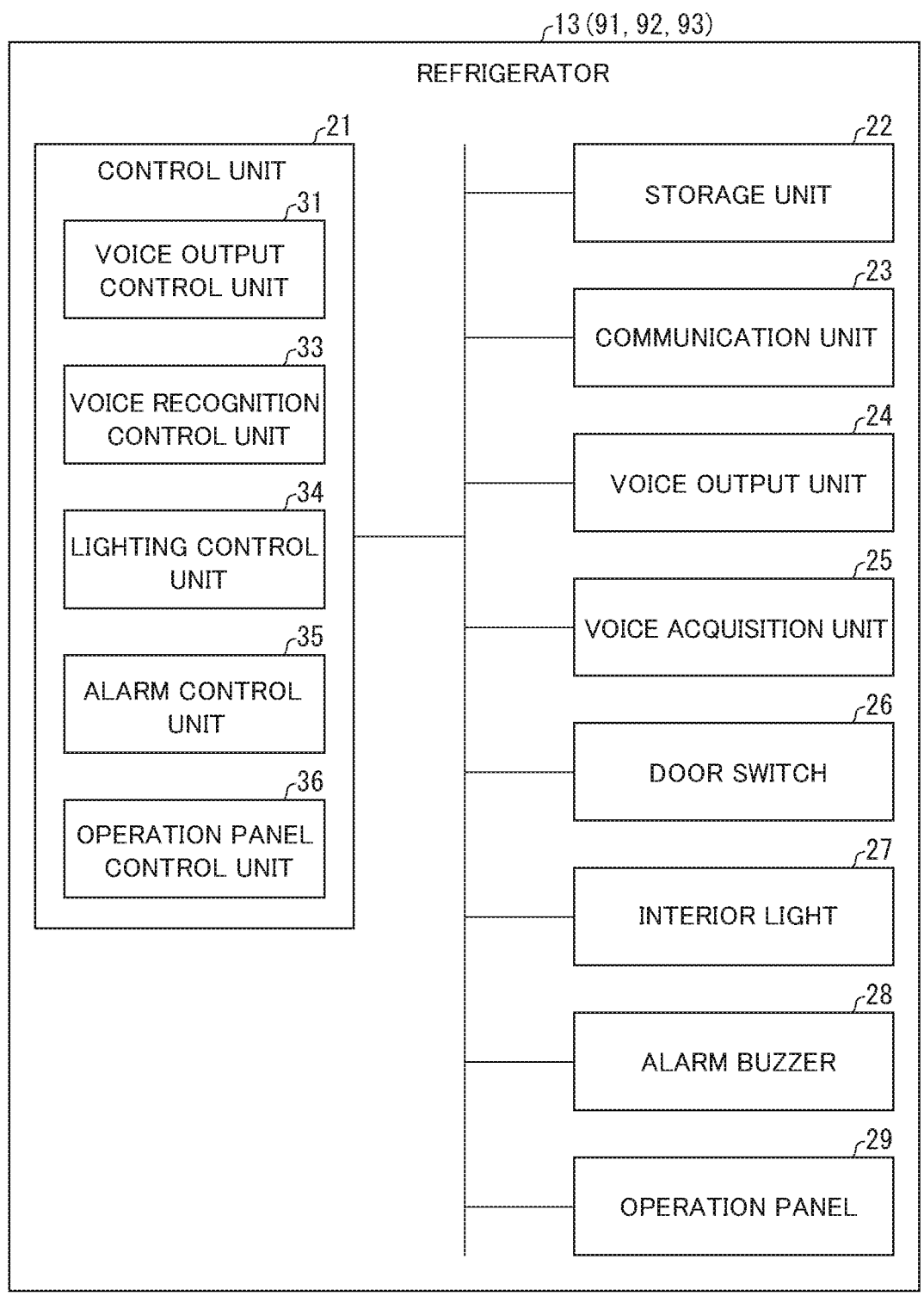
FIG. 2 is a block diagram showing a configuration of a control system of the refrigerator shown in FIG. 1.

FIG. 2 is a block diagram showing a configuration of a control system of the refrigerator 13. As shown in FIG. 2, the refrigerator 13 includes a control unit 21, a storage unit 22, a communication unit 23, a voice output unit 24, a voice acquisition unit 25, a door switch (a door opening and closing detection unit) 26, an interior light 27, an alarm buzzer (a warning unit) 28, and an operation panel 29. The control unit 21 includes a voice output control unit 31, a voice recognition control unit 33, a lighting control unit 34, an alarm control unit (a warning control unit) 35, and an operation panel control unit 36.

The control unit 21 may be realized, for example, using a microcomputer including an arithmetic processing unit such as a CPU (Central Processing Unit) or a dedicated processor, and the control unit 21 controls operations of various units of the refrigerator 13.

The storage unit 22 stores various kinds of information used in the refrigerator 13 and also stores voice data downloaded from the server 11 for use in uttering, voice data of an answer in a voice interaction, and the like. The communication unit 23 performs mutual communication with the server 11 via the communication network 15 under the control of the control unit 21.

The voice output unit 24 includes a speaker, and outputs a voice based on voice data under the control of the voice output control unit 31. The voice acquisition unit 25 includes a microphone 81 (see FIG. 5), and acquires a voice and converts the acquired voice into an electrical signal.

The door switch 26 detects an open/closed state of the door of the refrigerator 13. For example, the door switch 26 turns on when the door is open, while the door switch 26 turns off when the door is closed. The interior light 27 is on when the door of the refrigerator 13 is in the open state. The alarm buzzer 28 is a buzzer that warns a user that the door of the refrigerator 13 is left open.

The operation panel 29 includes a display unit functioning as a user interface that operates under the control of the operation panel control unit 36 such that the user inputs an instruction to the refrigerator 13 via the operation panel 29, or the state (internal temperature, set temperature, etc.) of the refrigerator 13 is displayed. In the present embodiment, the operation panel 29 is disposed in the inside of the refrigerator 13.

The voice output control unit 31 controls the voice output unit 24. More specifically, when there is voice data to be uttered, the voice output control unit 31 controls the voice output unit 24 to utter a voice according to the voice data. The voice data to be uttered is, for example, voice data received from the server 11, voice data stored in the storage unit 22, etc.

Furthermore, in a case where a voice uttered by a user indicated by the voice data acquired by the voice acquisition unit 25 satisfies a voice recognition start condition in the server 11, the voice recognition control unit 33 performs control such that the acquired voice data of the voice of the user is transmitted to the server 11 and the voice recognition on it is started. After the voice recognition is started in the server 11, the voice recognition control unit 33 sequentially transmits the voice data of the voice of the user acquired via the voice acquisition unit 25 to the server 11.

In a case where the voice uttered by the user indicated by the voice data acquired by the voice acquisition unit 25 does not satisfy the voice recognition start condition in the server 11, the voice recognition control unit 33 does not transmit the voice data to the server 11. Therefore, in this case, the voice recognition at the server 11 is not started.

When the voice recognition control unit 33 determines that the utterance by the user indicated by the voice data acquired by the voice acquisition unit 25 satisfies a voice recognition end condition in the server 11, the voice recognition control unit 33 stops the transmission of the voice data to the server 11. Alternatively, when an instruction to end voice recognition at the server 11 is received (for example, the instruction is input by the user via the operation panel 29), the voice recognition control unit 33 may stop the transmission of the voice data to the server 11. In these cases, the voice recognition at the server 11 is ended.

The voice recognition start condition is, for example, that the utterance by the user has risen at the end, that is, the utterance by the user is in an interrogative form, or that the utterance by the user includes a predetermined start keyword. An example of an utterance by the user in the interrogative form is "Where did I put XXX I bought before?". Examples of start keywords are "That?", "Where?", etc. Note that these utterances by the user in the interrogative form and start keywords indicate that the user has an intention to start a voice interaction with the refrigerator 13.

The voice recognition end condition is that a predetermined end keyword is included in the utterance by the user. Examples of end keywords in the utterance are "stop", "No", etc. Note that these utterances by the user and end keywords indicate that the user has an intention to stop the voice interaction with the refrigerator 13. An instruction to end the voice recognition is issued, for example, by operating a specific key set as a voice recognition end key on the operation panel 29.

In order to perform the above operation, the voice recognition control unit 33 has a frequency analysis function for detecting a rising tone at an end of an utterance by a user. Furthermore, the voice recognition control unit 33 has a voice recognition function for detecting that user voice data includes a start keyword or an end keyword. Note that end keywords may be detected by voice recognition processing at the server 11.

During a period in which the voice recognition control unit 33 transmits voice data acquired by the voice acquisition unit 25 to the server 11, that is, during a period in which the server 11 performs voice recognition on the voice data acquired by the voice acquisition unit 25, the lighting control unit 34 controls the interior light 27 so as to be in a lighting state different from the normal lighting state thereby notifying the user that the voice of the user is being recognized.

The lighting state different from the normal lighting state is, for example, a state in which the interior light 27 periodically repeats a bright state and a dark state, or a state in which the interior light 27 blinks. In a case where the interior light 27 is capable of changing the lighting color, the lighting control unit 34 may sequentially change the lighting color during the period in which the voice recognition control unit 33 is transmitting the voice data to the server 11.

The alarm control unit 35 detects opening/closing of the door of the refrigerator 13 by detecting turning on/off of the door switch 26, and activates the alarm buzzer 28 when the door open state continues for a predetermined time or more since the detection of the opening of the door thereby giving an alarm to the user.

The alarm control unit 35 operates the alarm buzzer 28 when the transmission of the voice data of the voice of the user to the server 11 is started or ended to notify the user of the start or the end of the transmission.

The operation panel control unit 36 receives a user input operation on the operation panel 29 and controls the display unit of the operation panel 29 to display the state of the refrigerator 13 (internal temperature, set temperature, etc.).

Configuration of Server 11

Figure 3:
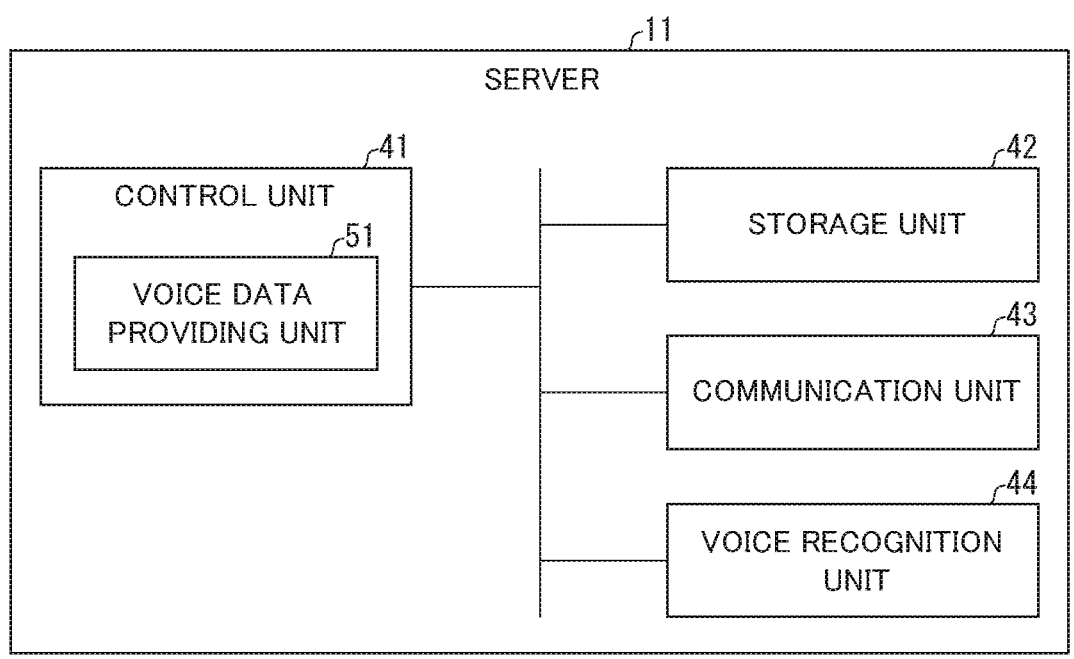
FIG. 3 is a block diagram showing a configuration of a control system of a server shown in FIG. 1.

FIG. 3 is a block diagram showing a configuration of a control system of the server 11. The server 11 manages the refrigerator 13. As shown in FIG. 3, the server 11 includes a control unit 41, a storage unit 42, a communication unit 43, and a voice recognition unit 44. The control unit 41 includes a voice data providing unit 51.

The control unit 21 is realized, for example, using a microcomputer including an operation processing unit such as a CPU (Central Processing Unit) or a dedicated processor. The control unit 21 controls the operation of each unit in the server 11.

The storage unit 42 stores various kinds of information used in the server 11. In addition, the storage unit 42 also stores examples of various sentences such as sentences that the voice data providing unit 51 refers to when the voice data providing unit 51 generates voice data to be provided to the refrigerator 13. The communication unit 43 communicates with the refrigerator 13 via the communication network 15 under the control of the control unit 41.

The voice recognition unit 44 performs voice recognition on voice data transmitted from the refrigerator 13 and received by the communication unit 43, and converts the voice data into a character string. The voice recognition unit 44 has not only the function of simply converting voice data into a character string but also a function of converting voice data into a meaningful sentence.

The voice data providing unit 51 obtains an answer in response to the above-described voice data obtained via the voice recognition, and provides voice data of the answer to the refrigerator 13. In this process, the voice data providing unit 51 may generate answer voice data by referring to the storage unit 42 or may acquire the voice data via the communication network 15.

Outline of Structure of Refrigerator 13

Figure 4:
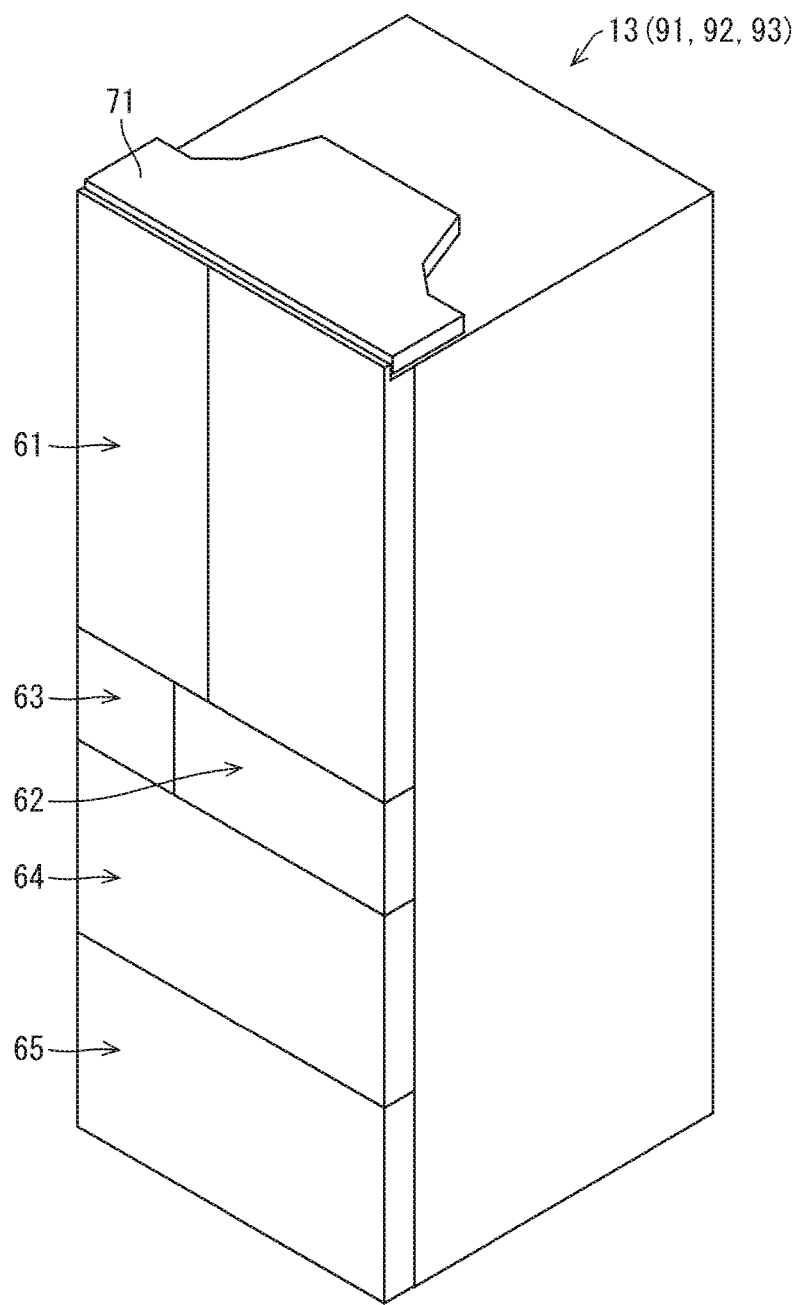
FIG. 4 is a perspective view showing an appearance of the refrigerator shown in FIG. 1.
Figure 5:
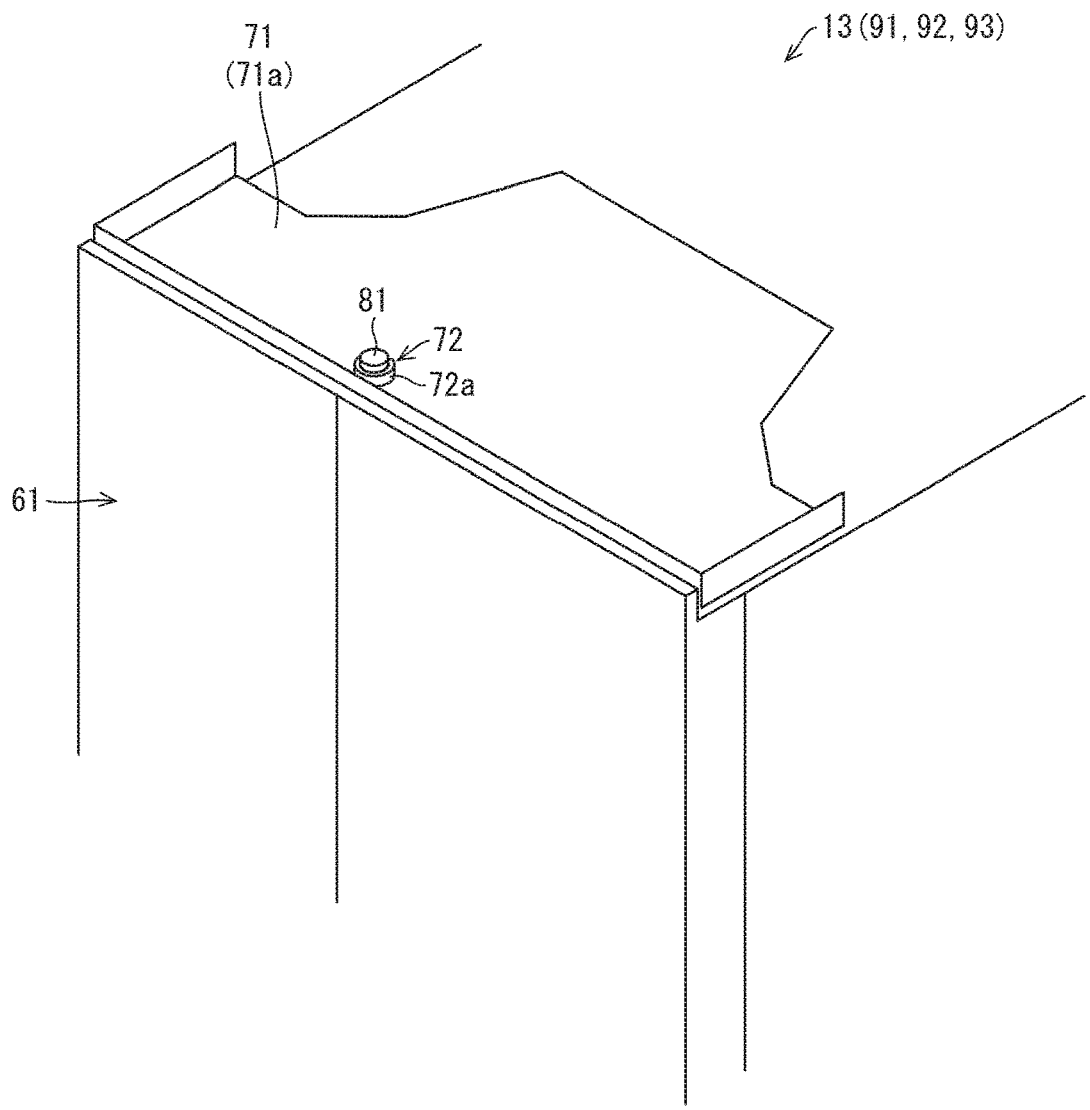
FIG. 5 is a perspective view showing an upper surface part of the refrigerator in a state where an upper cover of a cover member shown in FIG. 4 is removed.
Figure 6:
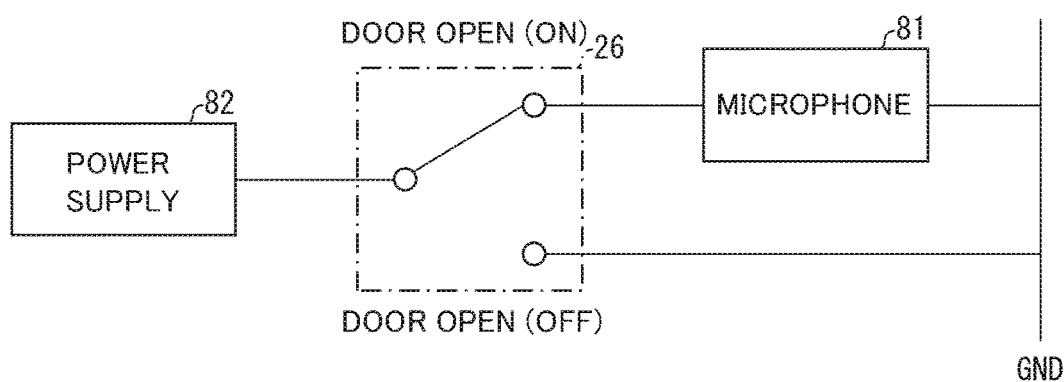
FIG. 6 is a circuit diagram showing a circuit configured to turn on/off a microphone in conjunction with turning on/off of a door switch of the refrigerator shown in FIG. 4.

FIG. 4 is a perspective view showing an appearance of the refrigerator 13. FIG. 5 is a perspective view showing an upper surface portion of the refrigerator 13 in a state where an upper cover of a cover member (a member) 71 shown in FIG. 4 is removed. FIG. 6 is a circuit diagram showing a circuit configured to turn on/off the microphone 81 in response to turning on/off of the door switch 26 (turning on/off of a first door 61) of the refrigerator shown in FIG. 4.

As shown in FIG. 4, the refrigerator 13 includes, for example, first to fifth doors 61 to 65 disposed in a direction from the upper part to the lower part. The first door 61 is a door of a refrigeration compartment. The second door 62 is a door of a temperate-adjustable freezer compartment. The third door 63 is a door of an ice making compartment. The fourth door 64 is a door of a freezing compartment. The fifth door 65 is a door of a vegetable compartment. The first door 61 is of a double door type. The operation panel 29 is disposed, for example, on an open end side of a larger door of the two doors of the first door 61.

The refrigerator 13 includes a cover member 71 disposed on the upper surface of the refrigerator 13. Inside the cover member 71, there are provided a hinge for rotatably supporting the first door 61, a door switch 26 for detecting opening/closing of the first door 61, and a microphone 81 possessed by the voice acquisition unit 25.

As shown in FIG. 5, the microphone 81 is attached to the microphone attachment portion 72 located near the center in the width direction of the refrigerator 13 on a front end portion of a lower cover 71a of the cover member 71 such that a voice input portion of the microphone 81 faces down. The microphone attachment portion 72 has a microphone holding portion 72a having a substantially cylindrical shape. In the lower cover 71a, a through hole penetrating the lower cover 71a is formed at a location below the microphone 81.

As shown in FIG. 6, the door switch 26 turns on, for example, when the first door 61 is opened, and turns off when the first door 61 is closed. The microphone 81 is connected to a power source 82 and turns on in response to turning-on of the door switch 26. Thus, the microphone 81 is easily turned on and off depending on a situation.

Operation of Refrigerator 13

Figure 7:
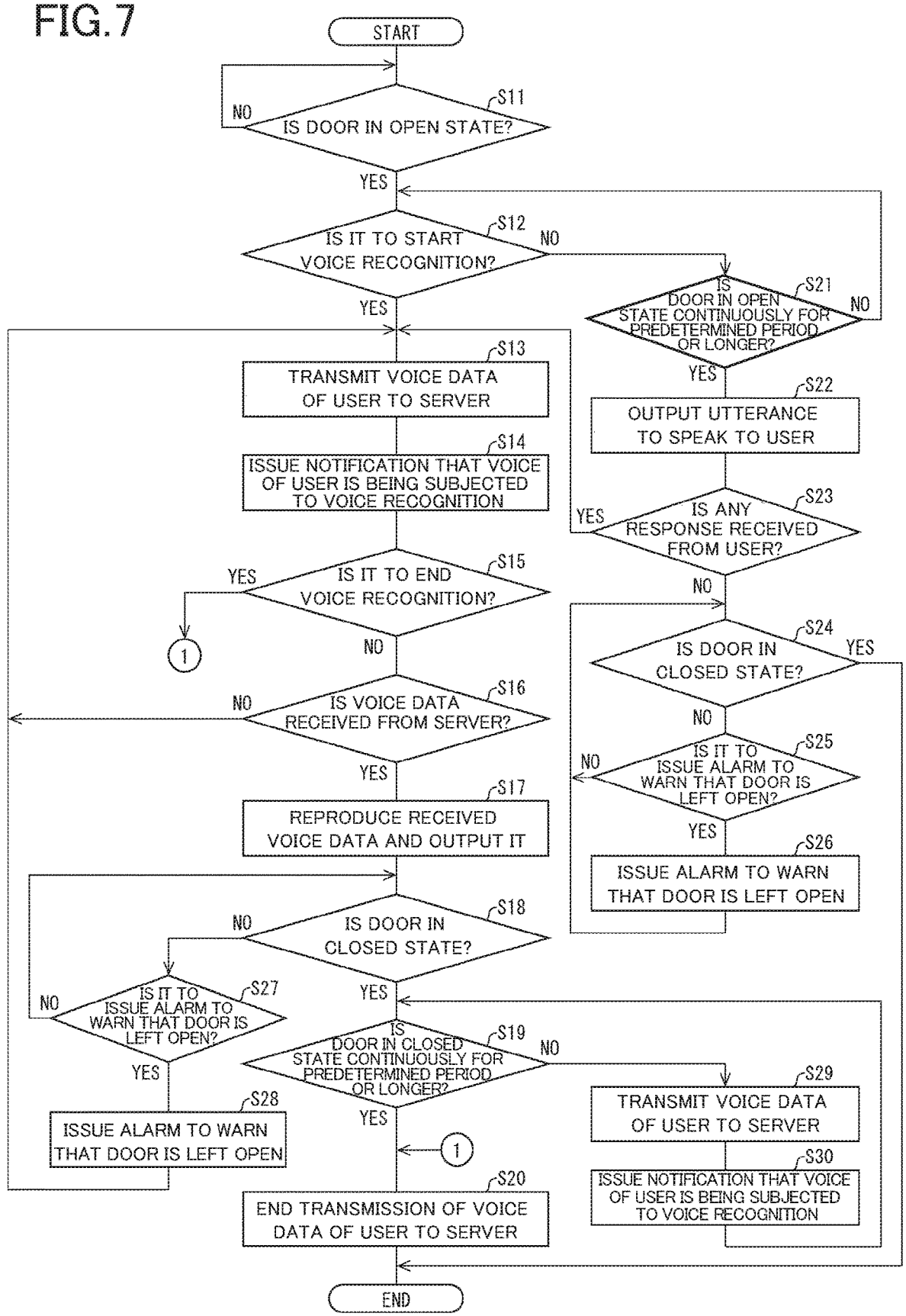
FIG. 7 is a flow chart showing an operation of the refrigerator in the voice interaction system shown in FIG. 1.

An operation of the refrigerator 13 in the voice interaction system 1 configured in the above-described manner is described below. FIG. 7 is a flow chart showing the operation of the refrigerator 13 in the voice interaction system 1. In this flow chart, the operation is described for a case where the opening/closing of the first door 61 is detected by detecting the turning-on/off of the door switch 26. Hereinafter, the first door 61 is also denoted simply as a door.

As illustrated in FIG. 7, when the voice interaction system 1 starts to operate, the control unit 21 monitors the on/off state of the door switch 26, that is, the opening/closing state of the door. When the door is opened (the door switch 20 turns on) (S11), the voice recognition control unit 33 of the control unit 21 acquires a voice of a user via the microphone 81 of the voice acquisition unit 25, and determines whether or not the voice recognition is to be started (S12). More specifically, in this determination, the voice recognition control unit 33 determines whether the voice uttered by the user satisfies the voice recognition start condition described above.

If the determination result in S12 is YES, the voice recognition control unit 33 transmits data of the voice uttered by the user acquired via the microphone 81 to the server 11 (S13).

Furthermore, the control unit 21 notifies the user that the voice uttered by the user is being recognized (S14) For this purpose of the notification, the lighting control unit 34 controls the interior light 27 to be in a lighting state different from the normal lighting state during a period in which the voice data of the voice of the user is transmitted to the server 11. More specifically, the interior light 27 is controlled so as to periodically repeat a bright state and a dark state, or so as to blink. Alternatively, in a case where the interior light 27 is capable of changing a lighting color, the lighting control unit 34 may repeatedly change the lighting color during the transmission period in which the voice data of the voice of the user is transmitted to the server 11. When the transmission of the voice data of the voice of the user to the server 11 is started, the alarm control unit 35 operates the alarm buzzer 28. Note that of the notification operations by the lighting control unit 34 and the alarm control unit 35, at least one of the notification operations may be performed.

Thereafter, the voice recognition control unit 33 determines whether or not the voice recognition is to be ended (S15). More specifically, in this determination, the voice recognition control unit 33 determines whether the voice uttered by the user satisfies the voice recognition end condition described above or whether an instruction to end the voice recognition has been issued by the user. If the result of the determination in S15 is YES, the operation proceeds to S20 in which the transmission of the voice data of the voice of the user to the server 11 is ended. In S20, the alarm control unit 35 operates the alarm buzzer 28 to notify the user that the transmission of the data of the voice uttered by the user to the server 11 has been completed. In this process, the alarm buzzer 28 generates an alarm so as to be different in tone or pitch from the alarm generated to notify of the start of the transmission of the data of the voice uttered by the user to the server 11 (S14). Thus, the user can realize, without wondering what operation status the voice recognition is in, that the voice data has started to be transmitted to the server 11 or that the transmission has been completed.

In a case where the determination result in S15 is NO and voice data of an answer is received from the server 11 (S16), the voice output control unit 31 controls the voice output unit 24 to reproduce the voice data into a voice and output the voice (S17).

Thereafter, when the door is closed (and thus the door switch 26 turns off) (S18) and the door is continuously in the closed state for a predetermined period of time (for example, 10 to 20 seconds) or longer (that is, when a predetermined time has elapsed since the detection of the closing of the door) (S19), the voice recognition control unit 33 ends the transmission of the voice data of the voice of the user to the server 11 (S20).

In a case where the result of determination in S12 is NO and the door is continuously in the open state for a predetermined period of time (for example, 10 seconds) or longer (S21), the voice output control unit 31 controls the voice output unit 24 to make an utterance to start speaking to the user (S22). Examples of utterances are, "Do you want to tell me something?", "How are you today?", or the like. The voice data used in this process is read out from the data storage unit 22.

When a response to the utterance made in S22 by the refrigerator 13 is returned from the user (S23), the operation proceed to S13 in which the voice data of the voice of the user acquired by the microphone 81 is transmitted to the server 11. Thereafter, the operations after S14 are performed in a similar manner.

On the other hand, in a case where no response is returned in S23 from the user and the door is continuously in the open state for a period equal to or greater than a predetermined length, the alarm control unit 35 determines that an alarm is to be issued to warn that the door is left open (S25), and operates the alarm buzzer 28 (S26). After that, the operation returns to S24. Thereafter, when the door is closed (and thus the door switch 26 turns off), the voice interaction system 1, that is, the refrigerator 13 ends the operation.

In a case where it is determined in S18 that the door is in an open state (and thus the door switch 26 is on), and the open state of the door continuous for a period of time equal to or greater than a predetermined length, the alarm control unit 35 determines that an alarm is to be issued to warn that the door is left open (S27), and the alarm control unit 35 operates the alarm buzzer 28 (S28). Thereafter, the operation returns to S13.

In a case where it is determined in S19 that the period of time in which the door is in the closed state is shorter than the predetermined period, the voice recognition control unit 33 transmits user voice data to the server 11 (S29), and the control unit 21 (the lighting control unit 34, the alarm control unit 35) notifies the user that the voice of the user is being recognized (S30). The operation then returns to S19. In a case where after S29 and S30, if voice data of an answer is received from the server 11 as in S16 and S17, the voice output unit 24 reproduces the voice data into a voice and outputs the resultant voice.

Relationship Between Voice Recognition Operation and Open/closed State of the Door of the Refrigerator 13

Figure 8:
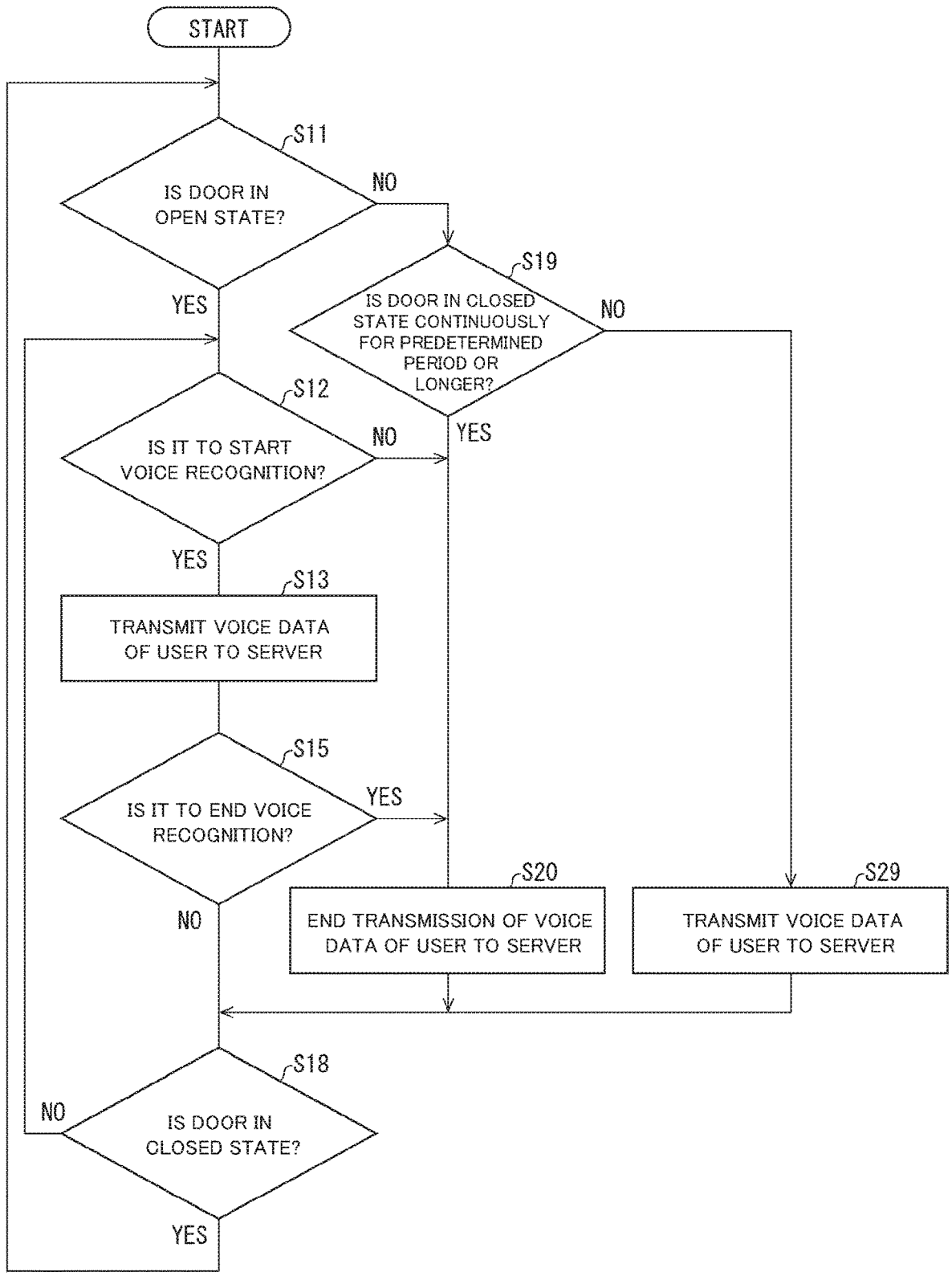
FIG. 8 is a flow chart showing an operation in which, among various operations of the refrigerator shown in FIG. 7, a focus is put on a relationship between a voice recognition operation and an open/closed state of a door.

Next, among various operations of the refrigerator 13 shown in FIG. 7, an operation of the refrigerator 13 described below with reference to FIG. 8 focusing on a relationship between a voice recognition operation and an open/closed state of a door. FIG. 8 is a flow chart showing an operation of the refrigerator 13 in which, among various operations of the refrigerator 13, a focus is put on a relationship between a voice recognition operation and an open/closed state of a door.

Operations denoted by numbers following S in FIG. 8 are similar to operations denoted by similar numbers following S in FIG. 7, and thus a description of the operations in FIG. 8 is omitted.

Advantages of Refrigerator 13

In the refrigerator 13, when the door of the refrigerator 13 is open, voice data is acquired via the microphone 81. In a case where the utterance by the user indicated by the voice data satisfies the voice recognition start condition, voice recognition is started. However, in a case where the voice recognition start condition is not satisfied, the voice recognition is not started. Note that the voice recognition start condition is, for example, that the utterance by the user is in an interrogative form or that the utterance by the user includes a predetermined start keyword, which indicates that the user has an intention to start a voice interaction with the refrigerator 13.

Therefore, when the user wants his/her voice to be voice-recognized or in a situation in which it is allowed to perform voice recognition, if the user makes an utterance that satisfies the voice recognition start condition to start, then the voice recognition is started without the user having to perform an operation to issue an instruction to start voice recognition, for example, via the operation panel 29. On the other hand, when the user does not want his/her voice to be voice-recognized, if the user does not make an utterance that satisfies the voice recognition start condition to start, then the voice recognition is not performed without the user having to perform an operation to issue an instruction to stop voice recognition, for example, via the operation panel 29. Thus, the refrigerator 13 can provide an improved convenience and can perform voice recognition on the utterance by the user at an appropriate timing.

Furthermore, in the refrigerator 13, when the server 11 is performing voice recognition, if the user makes an utterance and voice data thereof acquired via the microphone 81 satisfies the voice recognition end condition, the voice recognition is ended. The voice recognition end condition here is that a predetermined end keyword is included in the utterance by the user. Note that the keyword included in the utterance by the user indicate that the user has an intention to end the voice interaction with the refrigerator 13.

Therefore, the user is allowed to end voice recognition without performing an operation to issue a voice recognition end instruction, for example, via the operation panel 29. Thus, the refrigerator 13 can provide an improved convenience.

Furthermore, the refrigerator 13 continues voice recognition on the voice data of the voice uttered by the user until a predetermined time elapses since the door is closed. Therefore, even in a situation in which the user closes the door while speaking or when the user speaks immediately after closing the door, the refrigerator 13 can perform voice recognition on the utterance by the user, which provides an improved convenience.

Second Embodiment

A second embodiment of the present disclosure is described below. For convenience of explanation, components having similar functions to those described in the above embodiment are denoted by similar reference numerals, and a duplicated description thereof is not given.

Configuration of Voice Recognition Control Unit 33 of Refrigerator 91

In the refrigerator 13 according to the first embodiment described above, when an utterance by a user indicated by voice data acquired by the voice acquisition unit 25 satisfies the voice recognition start condition in the server 11, the voice recognition control unit 33 transmits the voice data of the voice of the user to the server 11 to start voice recognition. The voice recognition start condition in this case is that the utterance by the user is in an interrogative form (the utterance ends with a rising intonation), or that the user's utterance includes a predetermined start keyword.

In the second embodiment, the voice recognition start condition in the refrigerator 91 is that a volume of a voice indicated by voice data acquired in the door open state via the microphone 81 of the voice acquisition unit 25 is equal to or higher than a predetermined threshold value, and the voice data is recognized as voice data of a voice of the user. That is, when the voice recognition control unit 33 determines that the volume of the voice indicated by voice data acquired in the door open state via the microphone 81 is equal to or higher than the predetermined threshold value and that the voice data is of the voice of the user, the voice recognition control unit 33 transmits the voice data of the voice of the user acquired via the microphone 81 to the server 11 to start voice recognition.

Operation of Refrigerator 91

An operation of the refrigerator 91 in the voice interaction system 1 configured in the above-described manner is described below.

When the door is opened (and thus the door switch 26 turns on) in the operation shown in FIG. 7 (S11), the voice recognition control unit 33 determines whether or not voice recognition is to be started (S12). In this determination, the voice recognition control unit 33 determines whether the voice data acquired via the microphone 81 of the voice acquisition unit 25 satisfies the voice recognition start condition. More specifically, in a case where the volume of the voice indicated by the voice data acquired via the microphone 81 is equal to or greater than the predetermined threshold value and this voice data is of the voice of the user, the voice recognition control unit 33 determines in S12 that the voice recognition is to be started. If the determination result in S12 is YES, the voice recognition control unit 33 transmits the voice data acquired via the microphone 81 to the server 11 (S13). The other operations of the refrigerator 91 are performed in a similar manner to the operations of the refrigerator 13 described above with reference to FIG. 7.

Relationship Between Voice Recognition Operation and Open/closed State of the Door of the Refrigerator 91

Figure 9:
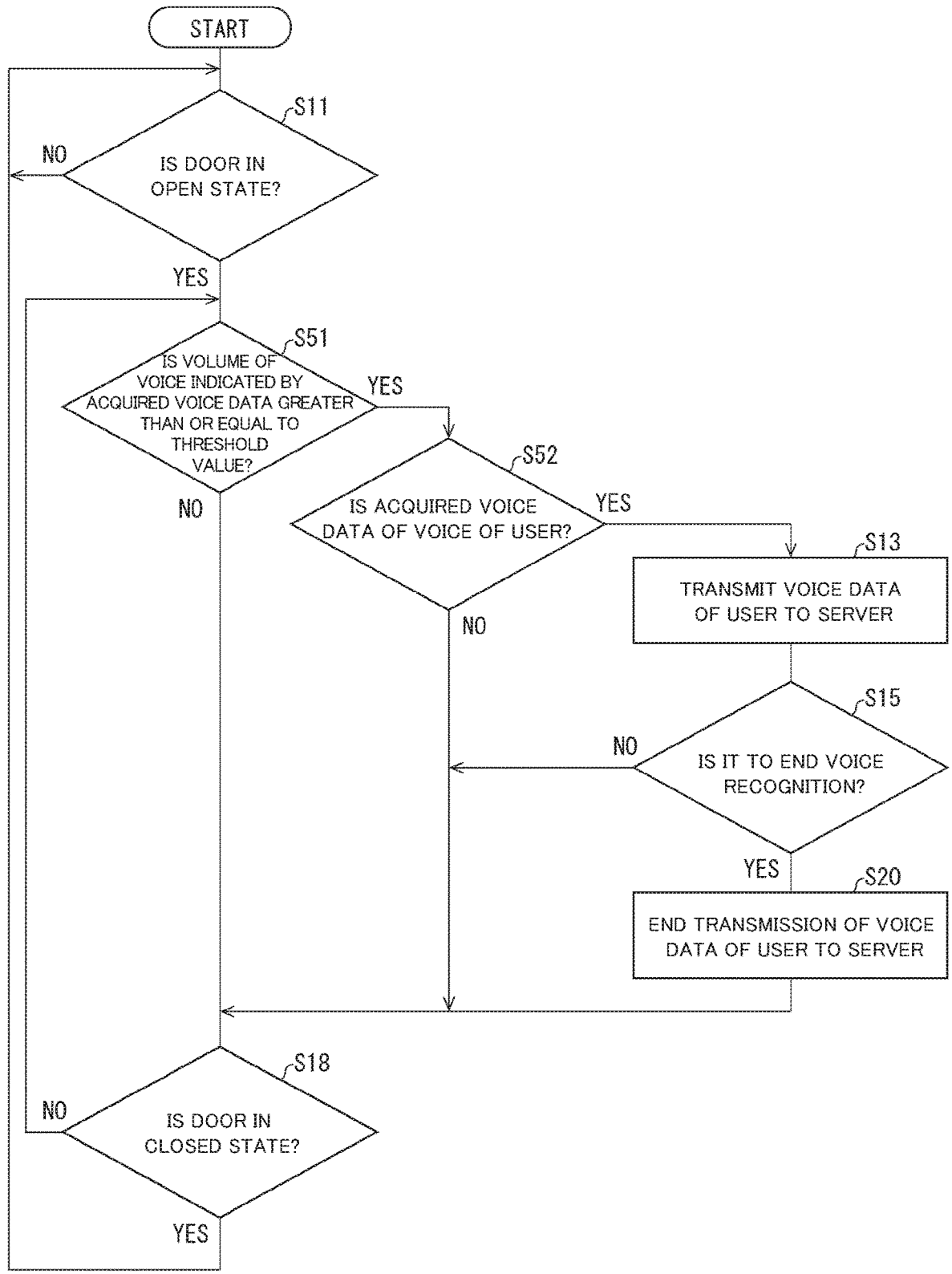
FIG. 9 is a flow chart showing an operation in which, among various operations of the refrigerator shown in FIG. 7, a focus is put on a relationship between a voice recognition operation and an open/closed state of a door according to another embodiment of the present disclosure.

Next, among various operations of the refrigerator 91 shown in FIG. 7, an operation of the refrigerator 91 is described below with reference to FIG. 9 focusing on a relationship between a voice recognition operation and an open/closed state of a door. FIG. 9 is a flow chart showing an operation of the refrigerator 91 in which, among various operations of the refrigerator 91, a focus is put on a relationship between a voice recognition operation and an open/closed state of a door. Operations denoted by numbers following S in FIG. 9 are similar to operations denoted by similar numbers following S in FIG. 7, and thus a description thereof is omitted. Operations in S51 and S52 correspond to the operation in S12 in FIG. 7.

As shown in FIG. 9, when the door is opened (and thus the door switch 26 turns on) (S11), the voice recognition control unit 33 acquires voice data via the microphone 81 of the voice acquisition unit 25, and determines, based on the acquired voice data, whether voice recognition is to be started or not. More specifically, in a case where it is determined that the volume of the voice indicated by the voice data acquired via the microphone 81 is equal to or higher than the predetermined threshold value (S51) and furthermore it is determined that this voice data is of the voice of the user (S52), the voice recognition control unit 33 transmits the voice data of the voice of the user to the server 11 to start voice recognition (S13).

On the other hand, in a case where it is determined in S51 that the volume of the voice indicated by the voice data acquired via the microphone 81 is less than the predetermined threshold value or in a case where it is determined in S52 that the voice data is not of the voice of the user, the voice recognition control unit 33 performs nothing.

In a case where voice data of the user is transmitted to the server 11 in S13 and voice recognition is started, the server 11 may transmit voice data of an answer as a response to the user to the refrigerator 91, and the voice data may be reproduced and output from the refrigerator 91.

Advantages of Refrigerator 91

In the refrigerator 91, as with the refrigerator 13, when the door of the refrigerator 91 is in the open state, voice data is acquired via the microphone 81, and if the utterance by the user indicated by the voice data satisfies the voice recognition start condition, voice recognition is started. However, when the voice recognition start condition is not satisfied, the voice recognition is not started. Note that the voice recognition start condition here is that the volume of the voice indicated by the voice data acquired via the microphone 81 is equal to or higher than the predetermined threshold value and the voice data is recognized as voice data of the voice of the user.

That is, when the user wants his/her voice to be voice-recognized or in a situation in which it is allowed to perform voice recognition, if the user makes an utterance that satisfies the voice recognition start condition, that is, if the user utters with a volume that is equal to or higher than the predetermined threshold value, then the voice recognition is started without having to perform an operation to issue an voice recognition start instruction, for example, via the operation panel 29. On the other hand, when the user does not want his/her voice to be voice-recognized if the user does not make an utterance that satisfies the voice recognition start condition, then voice recognition is not started even if an operation is not performed to issue an instruction to stop voice recognition is not performed, for example, via the operation panel 29. Thus, the refrigerator 91 can provide an improved convenience and can perform voice recognition on the utterance by the user at an appropriate timing.

Third Embodiment

A third embodiment of the present disclosure is described below. For convenience of explanation, components having similar functions to those described in the above embodiment are denoted by similar reference numerals, and a duplicated description thereof is not given.

Figure 10:
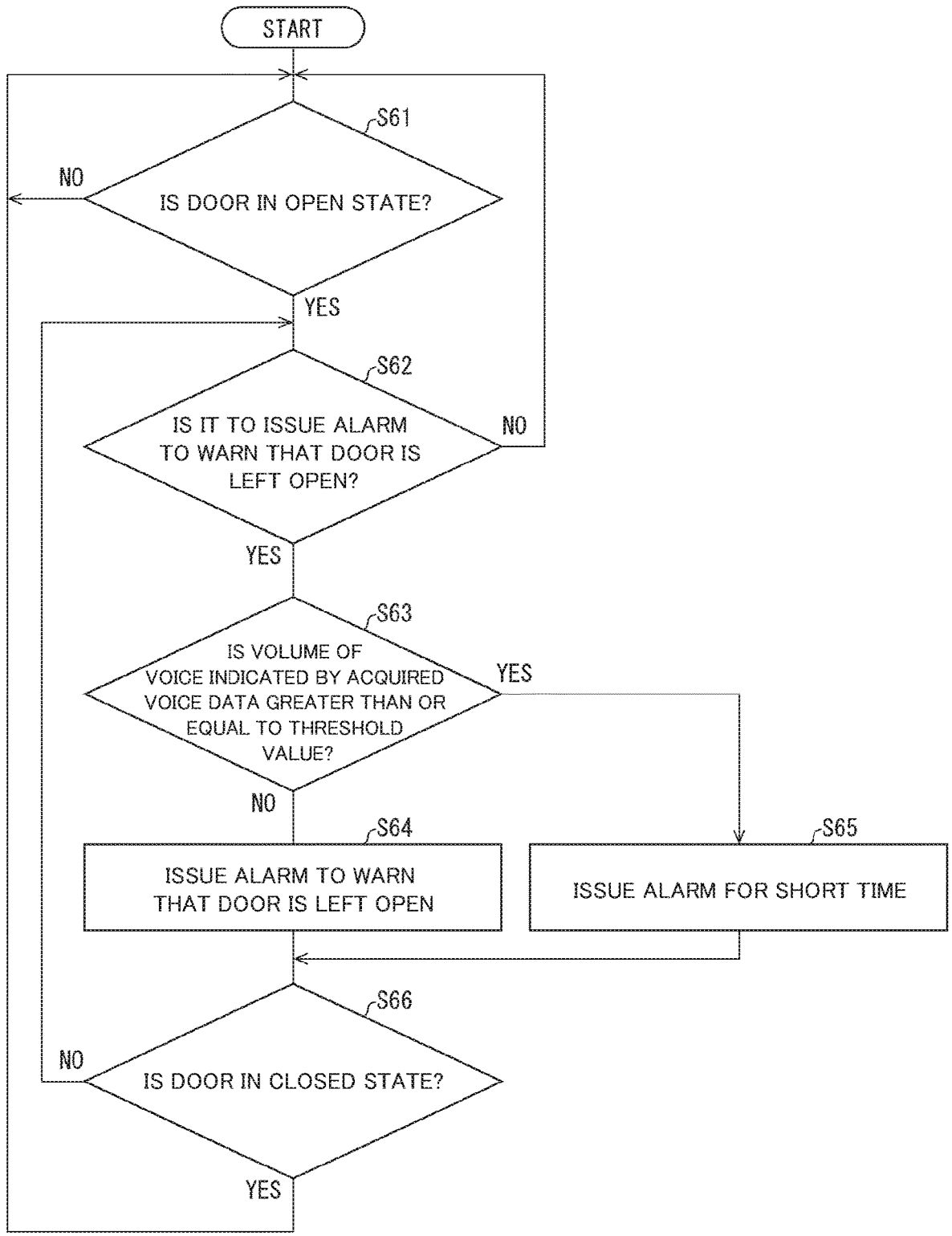
FIG. 10 is a flow chart showing an operation of an alarm control unit of a refrigerator according to still another embodiment of the present disclosure.

FIG. 10 is a flow chart showing an operation of an alarm control unit 35 of a refrigerator 92 in the voice interaction system 1 according to the third embodiment. In the refrigerator 13 shown in FIG. 7, when the open state of the door continuous for a period of time equal to or greater than a predetermined length, the alarm control unit 35 determines that an alarm is to be generated to warn that the door is left open (S25, S27), and the alarm control unit 35 simply operates the alarm buzzer 28 (S26, S28).

In contrast, in the present embodiment, when the alarm control unit 35 of the refrigerator 92 determines that an alarm is to be generated to warn that the door is left open, the alarm control unit 35 performs an operation shown in FIG. 10. That is, as shown in FIG. 10, if the door has been in an open state for a predetermined period of time or longer (for example, two minutes) after the opening of the door (S61), the alarm control unit 35 determines an alarm is to be generated to warn that the door is left open (S62).

More specifically, when the volume of the voice indicated by voice data acquired via the microphone 81 is less than the threshold value (S63), the alarm control unit 35 operates the alarm buzzer 28 (S64) to warn that the door is left open. Thereafter, the operation proceeds to S66. This alarm operation by the alarm control unit 35 is a normal alarm operation (in a normal situation) as with the operation in S26 and S28 shown in FIG. 7, and more specifically, for example, the alarm buzzer 28 is operated at short intervals for a long period of time.

On the other hand, if the alarm control unit 35 determines in S63 that the volume of the voice indicated by the voice data acquired via the microphone 81 is greater than or equal to the threshold value, the alarm control unit 35 issues an alarm with a short warning sound (S65). Thereafter, the operation proceeds to S66. Unlike the normal alarm operation in S64, this alarm operation by the alarm control unit 35 is performed, for example, such that the alarm buzzer 28 is sounded at long intervals for a short time.

As described above, when the volume of the voice indicated by the voice data acquired via the microphone 81 is equal to or higher than the threshold value, that is, when it is determined that the user is speaking in a state in which the door of the refrigerator 92 is open, the alarm control unit 35 sounds the alarm buzzer 28, for example, at long intervals for a short time. The control in S65 on the alarm buzzer 28 by the alarm control unit 35 is different from the normal control in S64 on the alarm buzzer 28 by the alarm control unit 35 in that it is intended not to disturb the utterance by the user and the acquisition of voice data uttered by the user via the microphone 81.

The control in S65 by the alarm control unit 35 on the alarm buzzer 28 is not limited to the example described above, but it may be performed in other various manners. For example, the operation interval of the alarm buzzer 28 may be simply increased (the silent time is increased), the volume of the alarm buzzer 28 may be simply reduced, or the operation interval of the alarm buzzer 28 may be increased and the alarm buzzer 28 is sounded for a short time with a small volume. Alternatively, the alarm control unit 35 may make a voice utterance using the voice output unit 24 to warn the user that the door is left open instead of performing, in S65, the alarm operation by the alarm buzzer 28. Still alternatively, as with a refrigerator 93 described later, the alarm operation may not be performed.

The control described corresponds, for example, to a case where the alarm is generated at a weal level when the alarm control unit 35 is configured to control the strength level of the alarm in steps in a range from the weak level to a strong level.

Advantages of Refrigerator 92

In the refrigerator 92, in the case where it is determined that the door open state continues for the predetermined time or longer and it is determined that an alarm is to be issued to warn that the door is left open, and furthermore it is determined that the volume of the voice indicated by the voice data acquired via the microphone 81 is less than the predetermined threshold value, then it is determined that the user is not speaking and the normal alarm operation is performed. On the other hand, in the refrigerator 92, in the case where it is determined that the door is in an open state that is to be alarmed and it is further determined that the volume of the voice indicated by the voice data acquired via the microphone 81 is greater than or equal to the predetermined threshold value, then it is determined that the user is speaking, and thus an alarm operation is performed in a mode different from the normal alarm operation mode such that the alarm does not interfere with the user's speech and the acquisition of the voice data of the voice of the user via the microphone 81.

The refrigerator 92 (the voice recognition control unit 33) according to the present embodiment has been described above for the case where the control is performed such that the alarm operation is performed in different manners depending on whether the volume of the voice indicated by the voice data acquired via the microphone 81 is less than the predetermined threshold value or is higher than or equal to the predetermined threshold value as described above. However, the refrigerator 92 (the voice recognition control unit 33) may be configured such that the condition that the volume of the voice indicated by the voice data acquired via the microphone 81 is less than the predetermined threshold value is replaced by the condition that the voice acquisition unit 25 has acquired a voice but the server 11 is not performing voice recognition, and the condition that the volume of the voice indicated by the voice data acquired via the microphone 81 is equal to or higher than the predetermined threshold value is replaced by the condition that the voice acquisition unit 25 has acquired a voice and the server 11 is performing voice recognition, and the control is performed such that the alarm operation is performed in different modes depending on the condition.

In this configuration of the refrigerator 92, when an alarm operation to warn that the door is left open is performed in response to continuation of the door open state for a predetermined time or longer, the alarm is issued such that it does not interfere with the user's speech and acquisition of the voice data of the voice of the user via the microphone 81.

Fourth Embodiment

A fourth embodiment of the present disclosure is described below. For convenience of explanation, components having similar functions to those described in the above embodiment are denoted by similar reference numerals, and a duplicated description thereof is not given.

Figure 11:
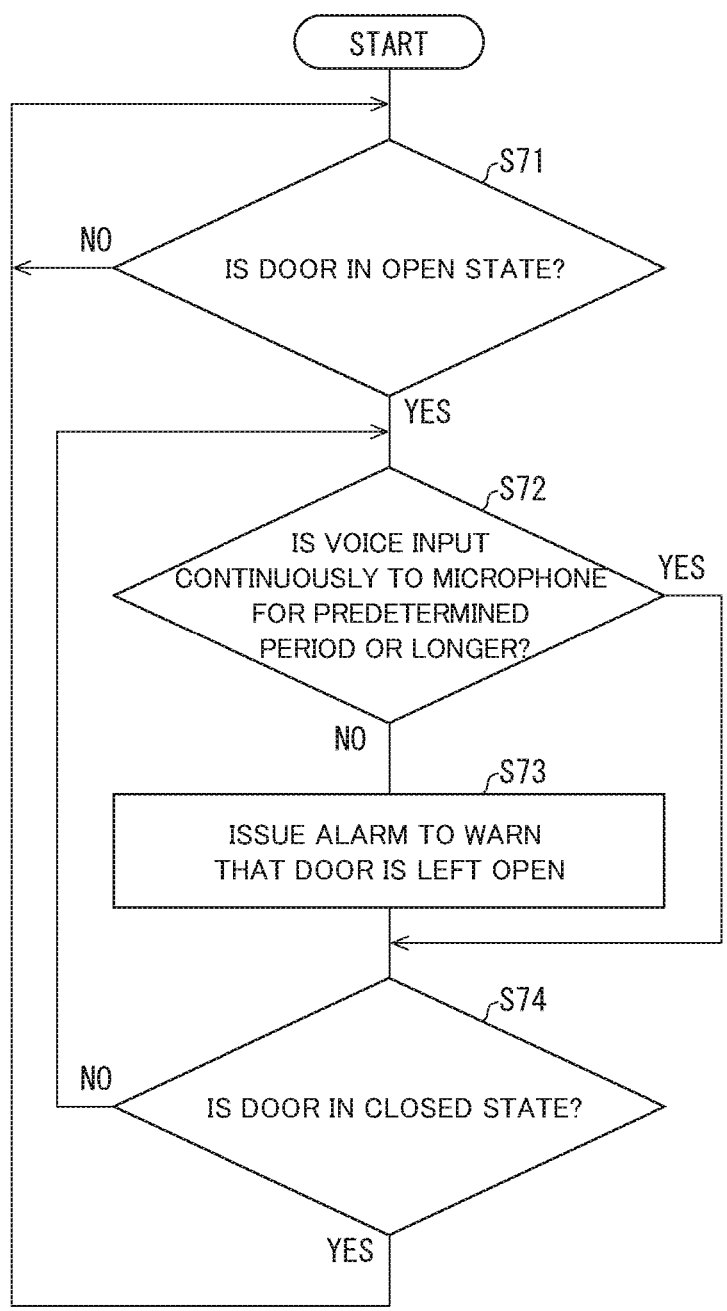
FIG. 11 is a flow chart showing an operation of an alarm control unit of a refrigerator according to still another embodiment of the present disclosure.

FIG. 11 is a flow chart showing an operation of an alarm control unit 35 of a refrigerator 93 in the voice interaction system 1 according to the present embodiment. In the present embodiment, the alarm control unit 35 of the refrigerator 93 performs operations S72 and S73 shown in FIG. 11 instead of the respective operations of S25 (S27) and S26 (S28) shown in FIG. 7.

That is, as shown in FIG. 11, if no voice input is input to the microphone 81 for a predetermined continuous period of time (S72) after the door is open (S71), the alarm control unit 35 of the refrigerator 93 determines that an alarm is to be issued to warn that the door is left open. In this case, the alarm control unit 35 operates the alarm buzzer 28 (S73) to warn that the door is left open. Thereafter, the operation proceeds to S74. Note that this alarm operation by the alarm control unit 35 is performed in the normal alarm operation mode similar to the operations in S26 and S28 shown in FIG. 7.

On the other hand, in a case where it is determined in S72 that a voice is continuously input to the microphone 81 for a predetermined period of time or longer, the alarm control unit 35 does not issue an alarm to warn that the door is left open (that is, the alarm control unit 35 does not operate the alarm buzzer 28), and the operation proceeds to S74.

As described above, when no voice is input to the microphone 81 for the predetermined period of time or longer, that is, when the user continuously speaks for the predetermined period of time or longer while leaving the door of the refrigerator 92 open, the alarm control unit 35 does not issue an alarm to warn that the door is left open (that is, the alarm control unit 35 does not operate the alarm buzzer 28). Note that by performing the control by the alarm control unit 35 in the above-described manner, it becomes possible to issue the alarm without interfering with the utterance by the user and the acquisition of voice data uttered by the user via the microphone 81.

Note that when it is determined in S72 that a voice is continuously input to the microphone 81 for the predetermined period of time or longer, the alarm control unit 35 may perform an operation similar to that performed by the alarm control unit 35 of the refrigerator 92 (for example, the operation in S65 shown in FIG. 10) instead of not issuing the alarm to warn that the door is left open.

Advantages of Refrigerator 93

In the refrigerator 93, in a case where it is determined that the door open state has continued for the predetermined period of time or longer and thus it is determined that the alarm is to be issued to warn that the door is left open, if no voice has been input to the microphone 81 for a predetermined period of time or longer, it can be concluded that the user has not uttered a voice and thus a normal alarm operation is performed. On the other hand, in the refrigerator 93, in a case where it is determined that the door open state has continued for the predetermined period of time or longer and it is determined that the alarm is to be issued to warn that the door is left open, if a voice has been continuously input to the microphone 81 for a predetermined period of time or longer, it is determined that the user is speaking and thus an alarm operation is not performed.

In the present embodiment, the refrigerator 93 (voice recognition control unit 33) performs control such that the alarm operation is performed or not performed depending on whether a voice has been continuously input or has not been continuously input to the microphone 81 for the predetermined period of time. However, in the refrigerator 93 (the voice recognition control unit 33), the condition that no voice has been input to the microphone 81 for the predetermined period of time may be replaced by the condition that the voice acquisition unit 25 has acquired a voice but the server 11 has not performed voice recognition, and the condition that a voice has been continuously input to the microphone 81 for the predetermined period of time is replaced by the condition that the voice acquisition unit 25 has acquired a voice and the server 11 is performing voice recognition, and the control may be performed such that the alarm operation is performed or not performed depending on the condition.

Thus, in this configuration of the refrigerator 93, when the door is continuously in the open state for the predetermined period of time and thus the normal alarm operation is performed to warn that the door is left open, the alarm operation is performed so as not to interfere with user's speech and the acquisition of the voice data of the voice of the user via the microphone 81.

Fifth Embodiment

In the embodiments described above, controlling of the voice recognition operation and the alarm operation has been described for a case where the first door 61 is opened and closed. However, the configuration of the above embodiments is not limited to the case where the first door 61 is opened and closed, but it is applicable also to the case where other doors such as the second to fifth doors 62 to 65 are opened and closed.

Sixth Embodiment

A sixth embodiment of the present disclosure is described below. For convenience of explanation, components having similar functions to those described in the above embodiment are denoted by similar reference numerals, and a duplicated description thereof is not given.

Figure 12:
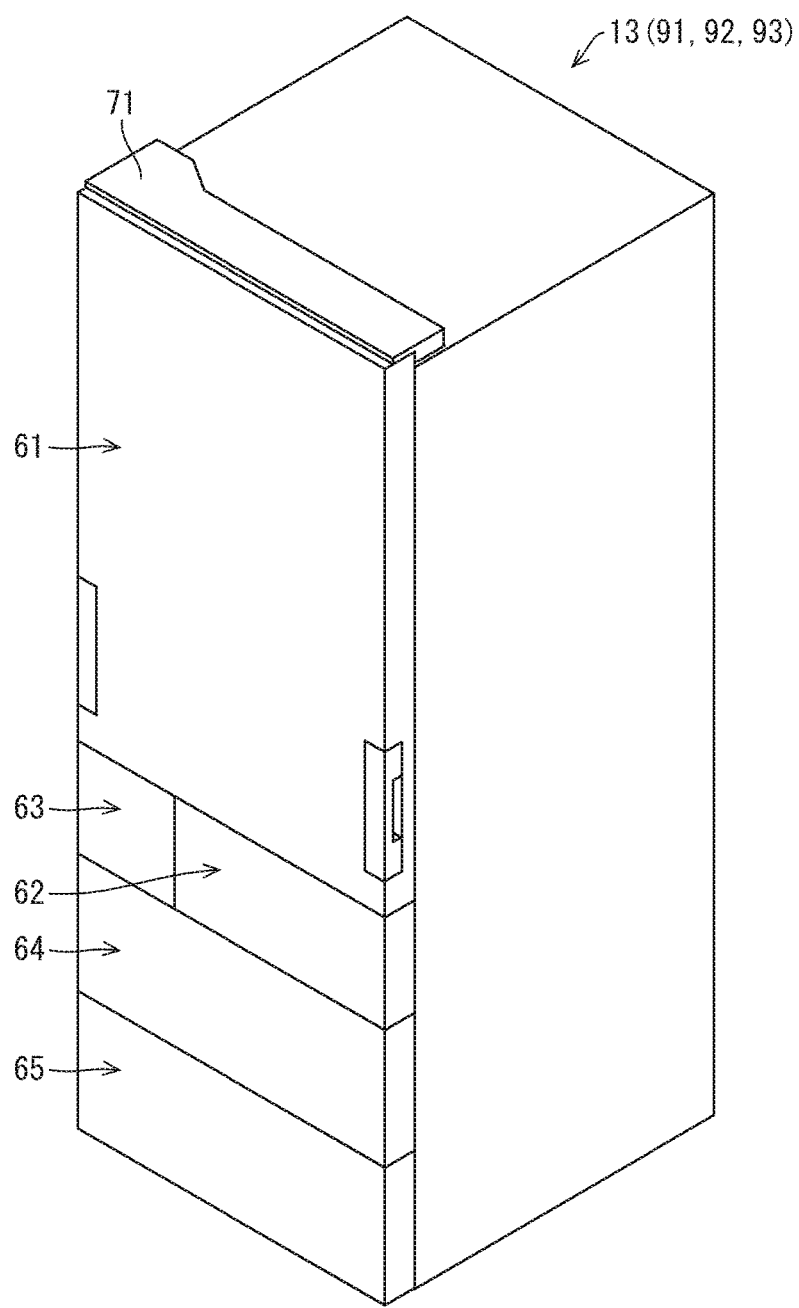
FIG. 12 is a perspective view illustrating an appearance of a refrigerator according to a further another embodiment of the present disclosure.
Figure 13:
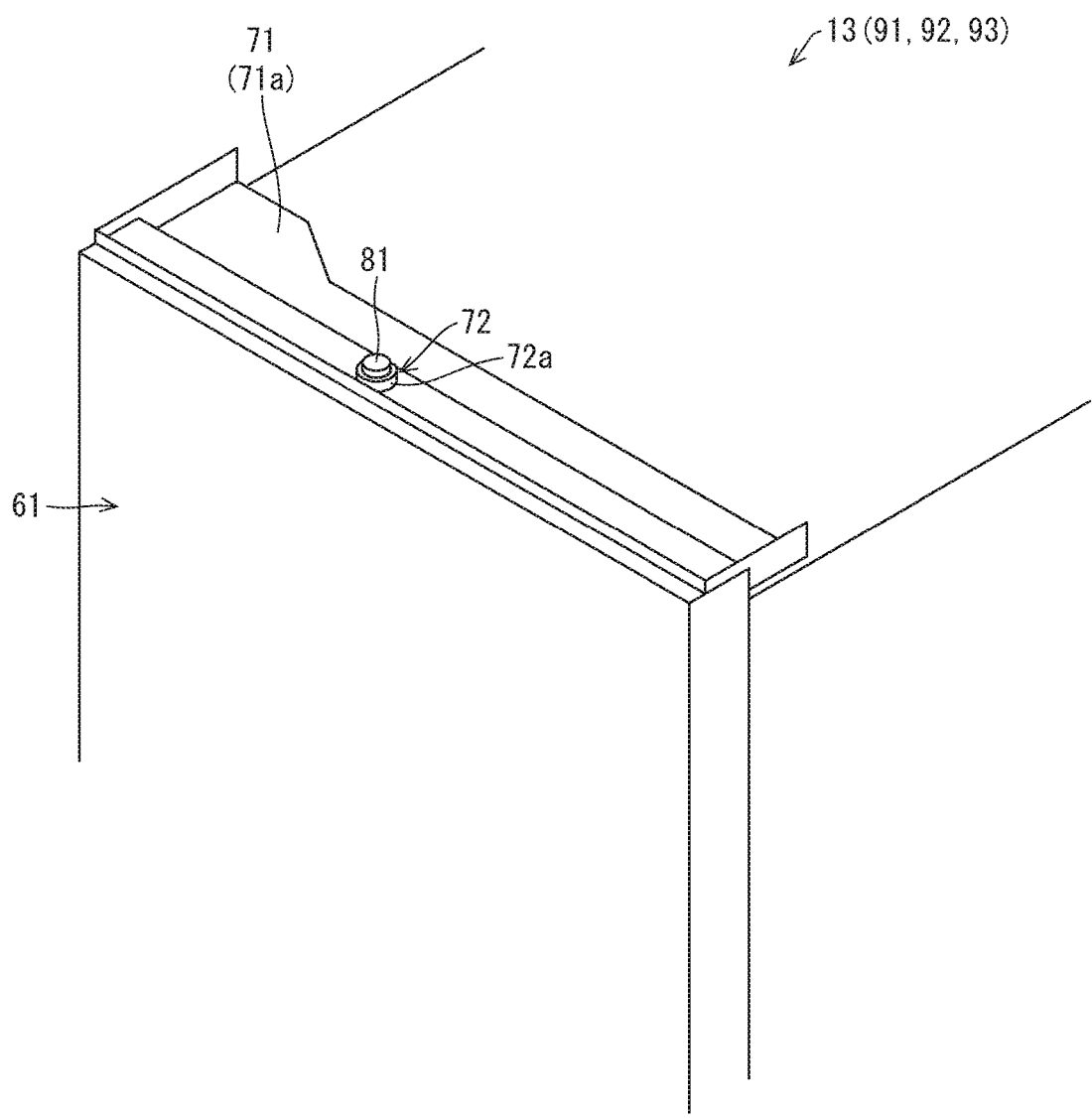
FIG. 13 is a perspective view showing an upper surface part of the refrigerator in a state where an upper cover of a cover member shown in FIG. 12 is removed.

FIG. 12 is a perspective view showing an appearance of refrigerators 91 to 93 according to the present embodiment. FIG. 13 is a perspective view showing an upper surface part of the refrigerator 13 in a state where an upper cover of a cover member 71 shown in FIG. 12 is removed.

In the previous embodiments, the descriptions have been given, by way of example, for a case where the first door 61 of each refrigerators 91 to 93 is of a double door type. However, the first door 61 of each of the refrigerators 91 to 93 may be of a single door type that can be opened to the right or left as shown in FIG. 12.

In this configuration, as shown in FIG. 13, the microphone 81 is attached to the microphone attachment portion 72 of the lower cover 71*a* of the cover member 71 such that the microphone 81 faces down, as in the case shown in FIG. 5.

Seventh Embodiment

Figure 14A:
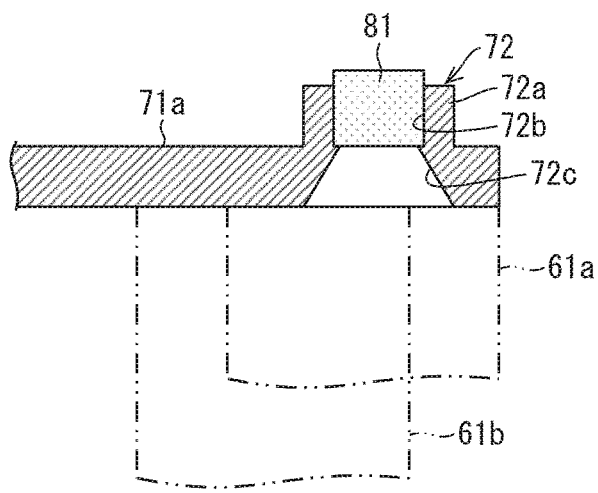
FIG. 14A is a longitudinal sectional view showing a positional relationship between a structure of a microphone attachment portion shown in FIG. 5 and a first door.
Figure 14B:
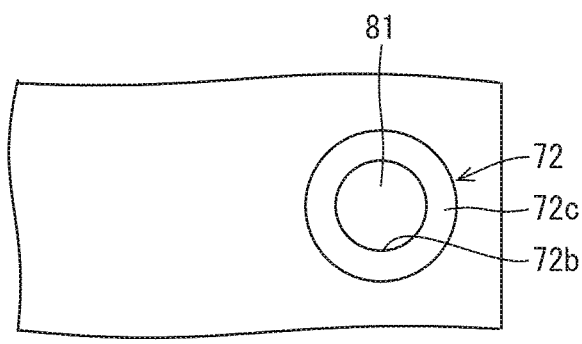
FIG. 14B is a bottom view of a lower cover of the structure shown in FIG. 14A as seen from below.

FIG. 14A is a longitudinal sectional view showing a positional relationship between a structure of the microphone attachment portion 72 and the first door 61 shown in FIG. 5. FIG. 14B is a bottom view of the lower cover 71*a* as seen from below to the structure shown in FIG. 14A.

Figure 15A:
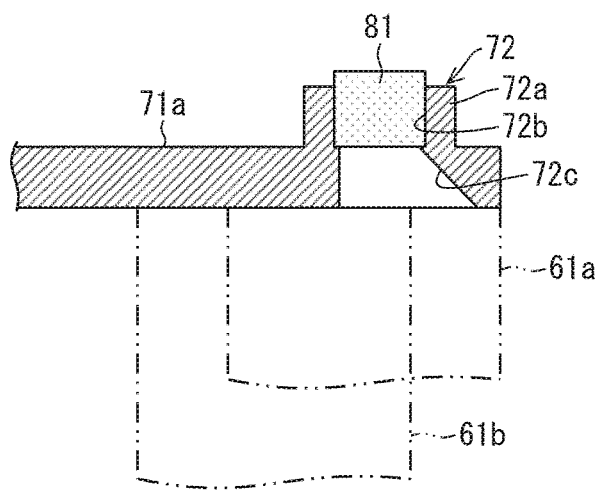
FIG. 15A is a longitudinal sectional view showing a positional relationship between a microphone attachment portion with a structure different from that shown in FIG. 14A and the first door.
Figure 15B:
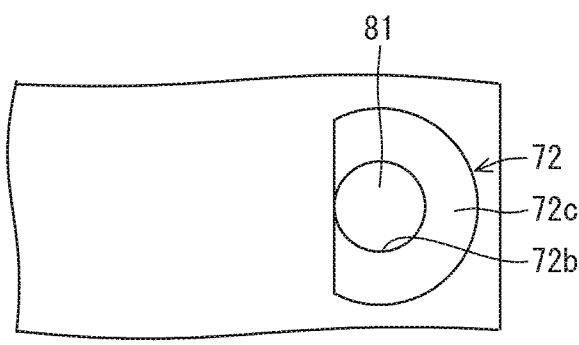
FIG. 15B is a bottom view of a lower cover of the structure shown in FIG. 15A as seen from below.

FIG. 15A is a longitudinal sectional view showing a positional relationship between another example of a structure of the microphone attachment portion 72 shown in FIG. 14A and the first door 61. FIG. 15B is a bottom view of the lower cover 71*a* as seen from below to the structure shown in FIG. 15A.

As shown in FIGS. 14A and 14B, the microphone attachment portion 72 includes a microphone holding part 72*a* for holding the microphone 81, a through hole 72*b* penetrating the lower cover 71*a*, and a cone-shaped portion 72*c* obtained by forming the lower cover 71*a* such that a portion thereof surrounding the through hole 72*b* has a shape of a cone expanding downward. The cone-shaped portion 72*c* possessed by the microphone attachment portion 72 can improve a sound collecting performance.

The positional relationship between the microphone attachment portion 72 and the first door 61 may be such that when the first door 61 is closed, the cone-shaped portion 72*c* is completely closed by the upper surface of the first door 61 (the first door 61*a*) as shown in FIG. 14A. Alternatively, when the first door 61 is closed, the cone-shaped portion 72*c* may not be completely closed by the upper surface of the first door 61 (the first door 61*b*) but the cone-shaped portion 72*c* may be partially exposed to the outer side of the first door 61 (the first doo 61*b*). In the latter case, even when the first door 61 (the first door 61*b*) is in the closed state, the microphone 81 can easily capture an external sound. Therefore, the latter configuration is suitable for controlling a voice recognition operation, an alarm operation, or the like in response to an opening/closing operation of second to fifth doors 62 to 65 other than the first door 61.

FIGS. 15A and 15B illustrate an alternative example of a structure of the microphone attachment portion 72 usable instead of the structure shown in FIGS. 14A and 14B. The microphone attachment portion 72 shown in FIGS. 15A and 15B is different from the microphone attachment portion 72 shown in FIGS. 14A and 14B in the shape of the cone-shaped portion 72*c*.

Summary of the Embodiments

In a first aspect of the present disclosure, a refrigerator includes a voice acquisition unit, a door opening and closing detection unit configured to detect opening and closing of a door of the refrigerator, and a voice recognition control unit configured such that when the door opening and closing detection unit detects opening of the door, the voice recognition control unit determines whether voice data acquired by the voice acquisition unit satisfies a predetermined voice recognition start condition, and in case where the voice data satisfies the voice recognition start condition, the voice recognition control unit controls the voice recognition unit to perform voice recognition on the voice data, while in a case where the voice data does not satisfy the voice recognition start condition, the voice recognition control unit controls the voice recognition unit not to perform voice recognition on the voice data.

In the refrigerator according to a second aspect of the present disclosure, based on the first aspect, the voice recognition control unit may determine, when the voice recognition unit is in operation of voice recognition, whether or not voice data acquired by the voice acquisition unit satisfies a predetermined voice recognition end condition, and in case where the voice data satisfies the voice recognition end condition, the voice recognition control unit may control the voice recognition unit not to perform voice recognition on the voice data.

In the refrigerator according to a third aspect of the present disclosure, based on the first or second aspect, the voice recognition control unit may control the voice recognition unit such that when the door opening and closing detection unit detects closing of the door, the voice recognition unit continuously perform voice recognition of the voice data for a predetermined period of time since the detection of the closing of the door, and when the predetermined period of time has elapsed since the detection of the closing of the door, the voice recognition unit ends the voice recognition on the voice data.

The refrigerator according to a fourth aspect of the present disclosure, based on one of the first to third aspects, may include a warning unit configured to warn a user, and a warning control unit configured such that when the door is continuously in an open state for a period of time greater than or equal to a warning threshold value, the warning control unit controls the warning unit to operate, wherein the warning control unit may control the warning unit such that in a case where the voice acquisition unit has acquired a voice but the voice recognition unit is not performing voice recognition, the warning control unit controls the warning unit to perform a normal warning operation, while in a case where the voice acquisition unit has acquired a voice and the voice recognition unit is performing voice recognition, the warning control unit controls the warning unit to perform an operation different from the normal warning operation.

The refrigerator according to a fifth aspect of the present disclosure, based on one of the first to third aspects, may include a warning unit configured to warn a user, and a warning control unit configured such that when the door is continuously in an open state for a period of time greater than or equal to a warning threshold value, the warning control unit controls the warning unit to operate, wherein the warning control unit may control the warning unit such that in a case where a volume of a voice indicated by the voice data acquired by the voice acquisition unit is smaller than a predetermined volume threshold value, the warning control unit controls the warning unit to perform a normal warning operation, while in a case where the volume of the voice indicated by the voice data acquired by the voice acquisition unit is greater than or equal to the predetermined volume threshold value, the warning control unit controls the warning unit to perform a warning operation different from the normal warning operation.

The refrigerator according to a sixth aspect of the present disclosure, based on one of the first to third aspects, may include a warning unit configured to warn a user, and a warning control unit configured such that when the door is continuously in an open state for a period of time greater than or equal to a warning threshold value, the warning control unit controls the warning unit to operate, wherein the warning control unit may control the warning unit such that in a case where no voice has been input to the voice acquisition unit for a predetermined continuous period of time, the warning control unit controls the warning unit to perform a normal warning operation, while in a case where a voice has been continuously input to the voice acquisition unit for a predetermined period of time, the warning control unit controls the warning unit to perform an operation different from the normal warning operation.

In the refrigerator according to a seventh aspect of the present disclosure, based on one of the first to sixth aspects, the voice acquisition unit may include a microphone, the microphone being attached to a member disposed on an upper surface of the refrigerator, the member having a through hole extending vertically through the member, the microphone being disposed in the through hole such that a voice input part facing down, a lower surface of the member being formed such that a portion surrounding the through hole has a shape of a cone expanding downward.

In an eighth aspect of the present disclosure, a voice interaction system of a refrigerator includes the refrigerator according to one of the first to seventh aspects, the voice recognition unit, and a server configured to perform voice recognition, using the voice recognition unit, on voice data received from the refrigerator so as to identify a content of an utterance and return an answer based on the identified content to the refrigerator.

The present disclosure contains subject matter related to that disclosed in Japanese Priority Patent Application JP 2018-210624 filed in the Japan Patent Office on Nov. 8, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A refrigerator comprising:
   a voice acquisition unit;
   a door opening and closing detection unit configured to detect opening and closing of a door of the refrigerator; and
   a voice recognition control unit configured such that when the door opening and closing detection unit detects opening of the door, the voice recognition control unit determines whether voice data acquired by the voice acquisition unit satisfies a predetermined voice recognition start condition, and in case where the voice data satisfies the voice recognition start condition, the voice recognition control unit controls the voice recognition unit to perform voice recognition on the voice data, while in a case where the voice data does not satisfy the voice recognition start condition, the voice recognition control unit controls the voice recognition unit not to perform voice recognition on the voice data,
   wherein the voice recognition start condition comprises at least one of (i) an utterance by a user is in an interrogative form, (ii) the utterance by the user includes a predetermined start keyword, which indicates that the user has an intention to start a voice interaction with the refrigerator, or (iii) a volume of a voice indicated by the voice data is equal to or higher than a predetermined threshold value and the voice data is recognized as voice data of the voice of the user,
   wherein the voice recognition control unit determines, when the voice recognition unit is in operation of voice recognition, whether or not the voice data acquired by the voice acquisition unit satisfies a predetermined voice recognition end condition, and in a case where the voice data satisfies the voice recognition end condition, the voice recognition control unit controls the voice recognition unit to end the voice recognition on the voice data, and
   wherein the voice recognition end condition comprises a predetermined end keyword is included in the utterance by the user.

2. The refrigerator according to claim 1, wherein the voice recognition control unit controls the voice recognition unit such that when the door opening and closing detection unit detects closing of the door, the voice recognition unit continuously performs voice recognition of the voice data for a predetermined period of time since the detection of the closing of the door, and when the predetermined period of time has elapsed since the detection of the closing of the door, the voice recognition unit ends the voice recognition of the voice data.

3. The refrigerator according to claim 1, further comprising:
   a warning unit configured to warn the user; and
   a warning control unit configured such that when the door is continuously in an open state for a period of time greater than or equal to a warning threshold value, the warning control unit controls the warning unit to operate,
   wherein the warning control unit controls the warning unit such that in a case where the voice acquisition unit has acquired a voice but the voice recognition unit is not performing voice recognition, the warning control unit controls the warning unit to perform a normal warning operation, while in a case where the voice acquisition unit has acquired a voice and the voice recognition unit is performing voice recognition, the warning control unit controls the warning unit to perform an operation different from the normal warning operation.

4. The refrigerator according to claim 1, further comprising:
a warning unit configured to warn a user; and
a warning control unit configured such that when the door is continuously in an open state for a period of time greater than or equal to a warning threshold value, the warning control unit controls the warning unit to operate,
wherein the warning control unit controls the warning unit such that in a case where a volume of a voice indicated by the voice data acquired by the voice acquisition unit is smaller than a predetermined volume threshold value, the warning control unit controls the warning unit to perform a normal warning operation, while in a case where the volume of the voice indicated by the voice data acquired by the voice acquisition unit is greater than or equal to the predetermined volume threshold value, the warning control unit controls the warning unit to perform a warning operation different from the normal warning operation.

5. The refrigerator according to claim 1, further comprising:
a warning unit configured to warn a user; and
a warning control unit configured such that when the door is continuously in an open state for a period of time greater than or equal to a warning threshold value, the warning control unit controls the warning unit to operate,
wherein the warning control unit controls the warning unit such that in a case where no voice has been input to the voice acquisition unit for a predetermined continuous period of time, the warning control unit controls the warning unit to perform a normal warning operation, while in a case where a voice has been continuously input to the voice acquisition unit for a predetermined period of time, the warning unit performs an operation different from the normal warning operation.

6. The refrigerator according to claim 1, wherein
the voice acquisition unit includes a microphone,
the microphone being attached to a member disposed on an upper surface of the refrigerator, the member having a through hole extending vertically through the member, the microphone being disposed in the through hole such that a voice input part faces down,
a lower surface of the member being formed such that a portion surrounding the through hole has a shape of a cone expanding downward.

7. A voice interaction system of a refrigerator comprising:
refrigerator according to claim 1;
the voice recognition unit; and
a server configured to perform voice recognition, using the voice recognition unit, on voice data received from the refrigerator so as to identify a content of an utterance and return an answer based on the identified content to the refrigerator.

* * * * *